A. E. LAXTON.
ARTIFICIAL HAND ATTACHMENT.
APPLICATION FILED MAR. 14, 1918.
1,307,866.
Patented June 24, 1919.
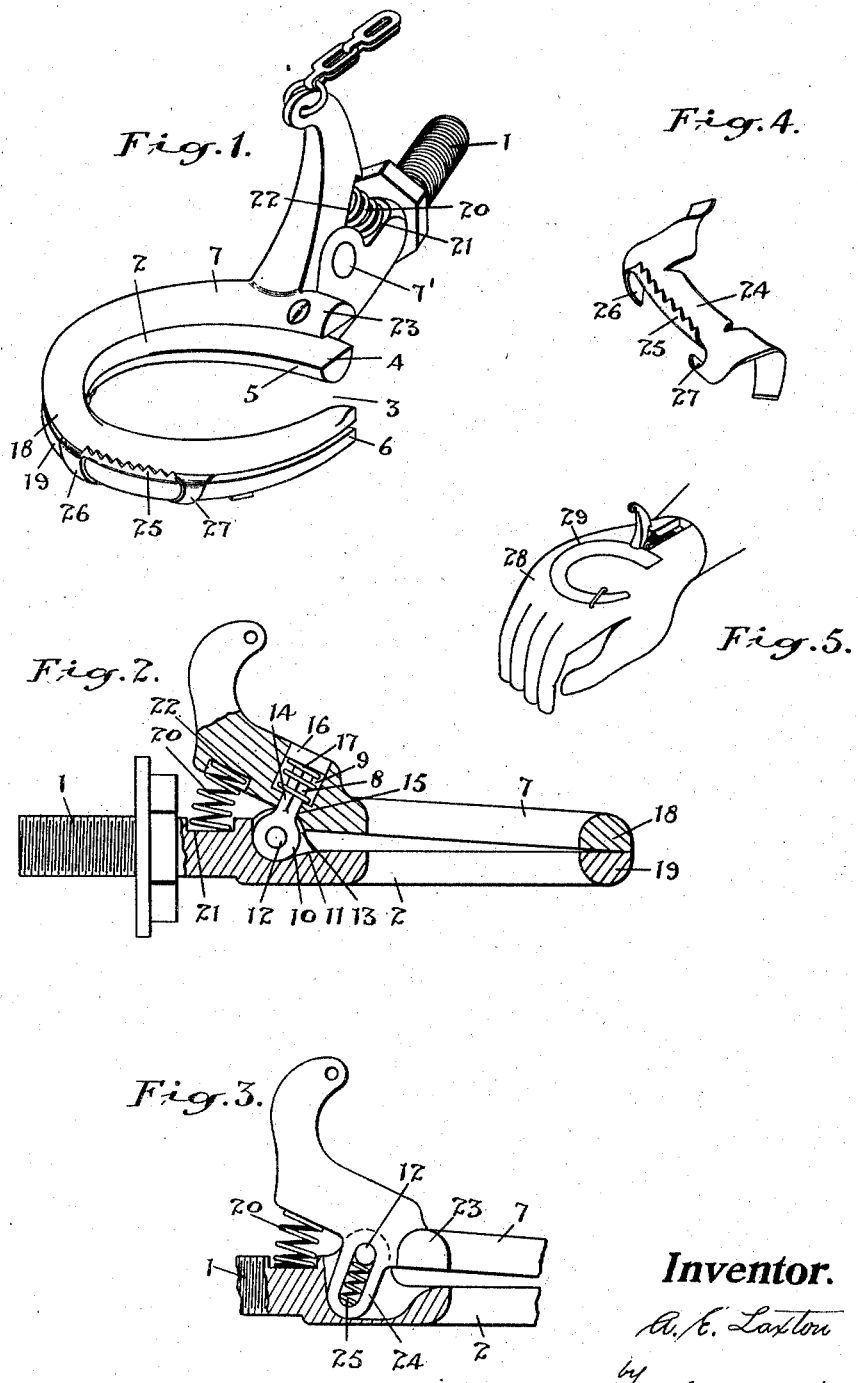

UNITED STATES PATENT OFFICE.

ALBERT E. LAXTON, OF TORONTO, ONTARIO, CANADA.

ARTIFICIAL-HAND ATTACHMENT.

1,307,866.   Specification of Letters Patent.   Patented June 24, 1919.

Application filed March 14, 1918. Serial No. 222,471.

*To all whom it may concern:*

Be it known that I, ALBERT EDWARD LAXTON, a subject of the King of Great Britain, and resident of the city of Toronto, county of York, Province of Ontario, in the Dominion of Canada, have invented certain new and useful Improvements in Artificial-Hand Attachments, described in the following specification and illustrated in the accompanying drawings, that form part of the same.

The principal objects of this invention are to provide extremely strong and durable artificial hand attachments of the hook type which will enable a person wearing the same to effectively handle implements and tools of various kinds with ease and security.

A further object is to provide a device of this character which may be operated effectively to pick up and hold small or large articles and to accomplish with facility the many necessary functions.

The principal feature of the invention consists in the novel construction and shape of the hook whereby a substantially circular holding member is provided with a shoulder portion adapted to receive thrust directly against the supporting member and whereby the transversely divided hook is adapted to be opened and closed to grip and hold various sized articles.

A further and important feature consists in providing a gripping member adapted to be detachably connected to the hook.

In the drawings Figure 1 is a perspective view of my improved hook.

Fig. 2 is a longitudinal mid-sectional view through the hook showing a slight modification in the form of the hinged joint of the upper section.

Fig. 3 is a vertical mid sectional detail showing a further modification of the hinged joint.

Fig. 4 is a perspective detail of the detachable gripping member for placing upon the hook.

Fig. 5 is a small perspective view showing the application of the hook to an artificial hand.

In the present device the threaded shank 1 is formed with the outward end 2 shaped into substantially circular form, a comparatively narrow gap 3 being formed at one side to form the hook. The circular portion extends past the shank on the side adjacent to the gap forming a spur 4 which provides a rigid shoulder surface 5 against which the wearer may push without danger of bending or distorting the device.

The point 6 of the hook extends beyond the end of the spur 4 a sufficient distance to enable the hook being inserted beneath any article which it is desired to lift or pull against. The metal of the hook member is preferably gradually tapered from the shank to the point, so as to give it great rigidity and strength.

The portion of the hook thus described forms the lower half of the hook member and is preferably formed half round in cross section.

The upper member 7 is a duplicate of the lower member to the point of connection with the shank and it is pivotally supported from the shank upon the pin 7' so that it may be operated to open or close thus forming the hook into a jaw.

The manner of pivotally connecting the upper hook member 7 to the shank may be varied and is shown in Fig. 2 as being effected by a pin member 8 which is secured in a recess 9 in the upper member and is provided with an eye-shaped lower end 10 which extends into a socket 11 in the shank. The eye end 10 is pivotally held within the socket upon a cross pin 12 secured in the side lugs 13. The shank 14 of the pin 8 is preferably squared and fits in a squared hole 15 in the member 7, thereby holding the member 7 from turning laterally or rotating upon the shank 14.

The upper end of the pin 8 is provided with a head 16 which fits snugly into the recess 9. The member 7 is slidably arranged upon the pin 8 and is spring held downwardly by means of the coil spring 17 encircling the pin 8 between the underside of the head 16 and the bottom of the recess 9.

The outer edges 18 and 19 of the hook members are adapted to meet closely together and the hook portions from such meeting edges inwardly are spread slightly apart. This provides an excellent means for picking up small articles, such as pins, matches, paper, etc., when the jaws of the hook are spread.

The jaws are tension held in contact by means of a coil spring 20 which is secured at one end of the recess 21 in the shank 1 and at the other end is seated in the recess 22 in the rearwardly extending end of the upper hook member 7. A lever 23 extends upwardly from the inner end of the upper hook 7 and is adapted to be connected to a suitable strap or cord connected to the artificial arm and which is adapted to be pulled by either an elbow or shoulder motion of the wearer. Such operating means is, however, quite common in devices of this character and does not affect the construction of the hand.

In the modification shown in Fig. 3 the upper member 7 is pivotally connected to the lower member by means of a slotted lug 24 through which the pin 12 extends. A coil spring 25 is inclosed within the slot to bear against the pin and hold the member to its lowermost position, allowing it to spring upwardly in order that the jaws may be spread apart to hold a large article.

In the operation and use of this device the hook being of substantially circular form receives, and allows of perfect freedom of movement, the handle of any implement such as a pitchfork, shovel, hoe, or broom and enables the user to both push and pull and press sidewise upon such handle with equal security and the provision of the spur projections 4 at the inner side of the hook forms a long bearing support, enabling the user to exert full pressure in pushing any implement held in the hook.

When it is desired to use the hand to pick up any article such as a piece of paper, a pen, a pencil, a pin or any small article, the upper jaw is operated to swing upon its pivot, thereby separating the jaws 18 and 19 and when the pull upon the lever is released these jaws come together upon the article.

The duplication in the construction of the upper and lower sections of the hook is extremely important as it enables the hand to be used for picking up articles in the manner described and also allows of the holding of any implement such as a fork, a comb, a file or any other flat article or round article, at any angle as the hook being substantially circular presents a double gripping contact on each side of the circle.

The attachment shown in Figs. 1 and 4 is adapted to be placed upon the hook to enable the wearer to take a very secure grip of certain articles, such as textile fabrics, carpets, skins, etc., and it consists of a plate member 24 having an upturned and preferably toothed outer edge 25 and downwardly and inwardly curved hook members 26 and 27 adapted to fit snugly around the lower hook member. The flat plate portion 24 rests upon the flat surface of the hook member and the toothed edge projects upwardly at the outer side of the upper hook member so that when the jaw is opened and a piece of cloth, a skin or anything in fact which it is desired to grip so that it can not slip, is taken into the jaw, the teeth will bite into it and grip it securely.

Only a few of the uses to which this device may be placed have been described by way of illustration but it is found in practice that it is almost universally adaptable to holding any kind of an article.

In Fig. 5 of the drawing I show an artificial hand 28 adapted to be used with the hook member, said hand having a cavity 29 arranged in the back and wrist portion to receive the hook member. The hand is covered with a glove and the wrist portion of the glove is slit and slipped over the lever 23.

What I claim as my invention is:—

1. An artificial hand attachment, comprising, a hook of substantially three-fourths of a circle having a shank arranged close to one end and extending substantially at right angles with said end, the other end of said hook being turned in a direction substantially parallel with the shank and projecting past a line drawn parallel with the shank at the inner terminal end of the hook.

2. An artificial hand, comprising, a hook of substantially circular formation and formed of two corresponding sections, one of said sections being pivotally supported upon the other section, and having a lever projection extending beyond a pivot, and a coil compression spring arranged between the lever and the pivotal section and the shank and the rigid section.

3. An artificial hand, comprising, a pair of hook-shaped members, one having a rigid shank and a transversely arranged pivot and the other having an adjustable and flexible pivotal connection with said pivot allowing of the spreading of the jaws, and a spring adapted to hold the jaws together.

4. An artificial hand, comprising, a hook member having a rigid shank and a central socket in the shank, a pin extending transversely of said socket, a clamping hook member having a rearwardly and upwardly projecting spur, a lug member extending downwardly from the spur of said clamping member and pivotally embracing said pivot pin, a coil spring engaging said pivotal member and spring holding the clamping member toward the pivot, and a coil compression spring arranged between the shank and the rigid hook of the spur and the pivotal hook.

5. In an artificial hand attachment, the combination with a split hook, of a separable gripper member adapted to be placed upon one section of the hook and presenting a gripping edge.

6. In an artificial hand attachment, the combination with a split hook, of a plate formed with an upturned serrated edge and curved fingers adapted to detachably embrace one section of the hook.

7. An artificial hand attachment comprising a hand having a cavity in the back extending to the wrist portion, and a hook member adapted to fit in said cavity in the hand and adapted to be secured thereto.

A. E. LAXTON.

Copies of this patent may be obtained for five cents each, by addressing the "Commissioner of Patents, Washington, D. C."